United States Patent
Chen et al.

[11] Patent Number: 5,933,311
[45] Date of Patent: Aug. 3, 1999

[54] CIRCUIT BREAKER INCLUDING POSITIVE TEMPERATURE COEFFICIENT RESISTIVITY ELEMENTS HAVING A REDUCED TOLERANCE

[75] Inventors: William W. Chen; Brett E. Larson, both of Cedar Rapids, Iowa

[73] Assignee: Square D Company, Palatine, Ill.

[21] Appl. No.: 09/054,153

[22] Filed: Apr. 2, 1998

[51] Int. Cl.⁶ .................................................. H02H 5/04
[52] U.S. Cl. ............................ 361/106; 361/58; 361/111
[58] Field of Search ................................. 361/91, 58, 103, 361/106, 111, 118, 119, 124, 127; 338/22 R, 225 D; 335/201

[56] References Cited

U.S. PATENT DOCUMENTS

| | | | |
|---|---|---|---|
| 3,916,264 | 10/1975 | Berg | 338/22 R |
| 4,070,641 | 1/1978 | Khalid | 338/61 |
| 4,562,323 | 12/1985 | Belbel et al. | 200/151 |
| 4,596,911 | 6/1986 | Guery et al. | 200/151 |
| 4,677,266 | 6/1987 | Belbel et al. | 200/151 |
| 4,801,772 | 1/1989 | Bratkowski et al. | 200/151 |
| 5,195,013 | 3/1993 | Jacobs et al. | 361/106 |
| 5,214,405 | 5/1993 | Glas | 337/71 |
| 5,254,816 | 10/1993 | Shutoh et al. | 338/21 |
| 5,303,115 | 4/1994 | Nayar et al. | 361/106 |
| 5,345,126 | 9/1994 | Bunch | 361/24 |
| 5,378,407 | 1/1995 | Chandler et al. | 252/513 |
| 5,382,938 | 1/1995 | Hansson et al. | 338/22 R |
| 5,414,403 | 5/1995 | Grueter et al. | 338/22 R |
| 5,424,504 | 6/1995 | Tanaka et al. | 218/78 |
| 5,428,195 | 6/1995 | Arnold | 218/1 |
| 5,428,493 | 6/1995 | Takeuchi et al. | 361/27 |
| 5,436,609 | 7/1995 | Chan et al. | 338/22 R |
| 5,473,495 | 12/1995 | Bauer | 361/11 |
| 5,495,083 | 2/1996 | Aymami-Pala et al. | 218/1 |
| 5,530,613 | 6/1996 | Bauer et al. | 361/58 |
| 5,539,370 | 7/1996 | Arnold | 337/8 |
| 5,629,658 | 5/1997 | Chen | 335/201 |
| 5,667,711 | 9/1997 | Mody et al. | 219/505 |
| 5,686,830 | 11/1997 | Takakura et al. | 324/73.1 |
| 5,742,223 | 4/1998 | Simendinger, III et al. | 338/21 |

FOREIGN PATENT DOCUMENTS

WO 91/12643   8/1991   WIPO .................... H02H 3/093

*Primary Examiner*—Ronald W. Leja
*Attorney, Agent, or Firm*—Larry I. Golden; Kareem M. Irfan

[57] ABSTRACT

A circuit breaker including a switch having an open and a closed position connected to a line of the circuit breaker. A first actuating device, actuated by a first activating signal, is connected to the switch to move the switch from the closed position to the open position wherein the flow of electric current in the line is interrupted. A positive temperature coefficient resistivity element (PTC element) is tripped at least once wherein the tolerance of the PTC element is reduced and the PTC element is connected to the first actuating device for providing the first activating signal. In another embodiment of the present invention, a second actuating device, actuated by a second activating signal provided by the circuit breaker current, is connected to the switch to move the switch from the closed position to the open position wherein the flow of electric current in the line is interrupted. In another embodiment of the present invention, a plurality of PTC elements are tested to determine a tolerance value for each of the PTC elements and at least two of the PTC elements are matched wherein, when the at least two PTC elements are connected in parallel, the combined tolerance is reduced and wherein the ampere rating for the line is increased. In another embodiment of the present invention, the plurality of PTC elements are tripped at least once before testing and matching to further reduce the tolerance of the PTC elements.

12 Claims, 3 Drawing Sheets

CIRCUIT BREAKER INCLUDING POSITIVE TEMPERATURE COEFFICIENT RESISTIVITY ELEMENTS HAVING A REDUCED TOLERANCE

BACKGROUND OF THE INVENTION

1. Field of the Invention

This invention relates to the use of elements with positive temperature coefficient resistivity (PTC elements) in circuit breakers.

2. Description of the Related Art

A circuit breaker protects circuits not only in short circuit situations but also in overload situations. For instance, according to UL489 requirements, the circuit breaker must trip within an hour when current reaches 135% of the ampere rating of the breaker. Typically, a bimetal is used in existing circuit breakers for overload protection. The bimetal is a current carrying part in low ampere rated circuit breakers. However, in high ampere rated circuit breakers, the bimetal does not carry current directly. When an overload situation occurs, the high current increases the temperature of the bimetal and the bimetal is deflected by the heat, causing the circuit breaker to trip.

Circuit breakers including bimetal must be calibrated which significantly raises the cost of manufacturing and include many other disadvantages related to using the bimetal and calibration. However, even with calibration the bimetal does not always behave consistently and a calibrated circuit breaker will not always trip at the set overload rating.

The method and apparatus of the present invention uses one or more conductive polymer elements such as a positive temperature coefficient resistivity element (PTC element) to replace the bimetal in a circuit breaker thereby eliminating the need for calibration as well as other problems associated with the use of bimetal in circuit breakers.

An important issue in practically designing a circuit breaker with the PTC element replacing the bimetal is the tolerance level of the PTC element. According to the published specifications of typical PTC elements, such as those manufactured by Raychem or Bourns, the PTC element's tolerance is usually too large to be practically used in circuit breaker design. For an example, Raychem's RUE900™ has a hold current of 9 A and a trip current of 18 A at 20° C. The hold current is defined as the maximum current at which the RUE900™ will always trip the circuit breaker at 20° C. In other words, the PTC element is only guaranteed to trip when the current reaches 200% of the ampere rating at room temperature. As mentioned before, circuit breakers are required by the UL489 standard to trip if current reaches 135% of the ampere rating.

The present invention discloses a method for narrowing the tolerance of the PTC element providing for circuit breakers practically designed with the PTC element replacing bimetal.

SUMMARY OF THE INVENTION

A circuit breaker and method for interrupting the flow of electric current in a line is disclosed including a method for reducing the current and resistance tolerance levels of one or more PTC elements used in the circuit breaker. A switch is connected to the line, the switch having an open and a closed position. A first actuating device, actuated by a first activating signal, is connected to the switch to move the switch from the closed position to the open position wherein the flow of electric current in the line is interrupted. A positive temperature coefficient resistivity element (PTC element) is tripped at least once wherein the tolerance of the PTC element is reduced, The PTC element is connected to the first actuating device for providing the first activating signal. The tolerance of the PTC element can be determined by measuring the resistance of the PTC element or both the resistance and the mass of the PTC element. In another embodiment of the present invention, a second actuating device is actuated by a second activating signal provided by a predetermined circuit breaker current level. The second actuating device is connected to the switch to move the switch from the closed position to the open position when actuated wherein the flow of electric current in the line is interrupted.

In another embodiment of the present invention, a plurality of PTC elements is tested to determine a tolerance value for each of the PTC elements. At least two of the PTC elements are matched wherein, when the at least two PTC elements are connected in parallel, the combined tolerance is reduced and wherein the ampere rating for the line is increased. For example, a high resistance PTC element is matched with a low resistance PTC element or a medium resistance PTC element is matched with a medium resistance PTC element. In another embodiment of the present invention, the plurality of PTC elements are tripped at least once before testing and matching to further reduce the tolerance of the PTC elements.

The present invention provides a method and circuit breaker wherein one or more PTC elements are used to perform the thermal trip function for the circuit breaker. The bimetal typically used in circuit breakers is replaced by the PTC element.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENTS

The initial resistance of a positive temperature coefficient resistivity element (PTC element) varies widely and typically is too large to meet the practical needs of most circuit breakers. For example, the initial resistance of the RUE900™ PTC element varies from 0.005 ohm to 0.01 ohm with relative difference of 100% between the multiple PTC elements, and the initial resistance of the RUE700™ PTC element varies from 0.005 to 0.01 ohm with a relative difference of 300% between the PTC elements. However, the deviation of the initial resistance of a PTC element is decreased by tripping the PTC element at least once after manufacturing. For example, the tolerance of the RUE900™ PTC element is 0.0076 ohm to 0.0095 ohm with a relative difference of 36% between the PTC elements after tripping multiple PTC elements. By tripping multiple PTC elements at least once, the relative difference among the PTC elements can be reduced making the use of PTC elements in circuit breakers much more reliable. The PTC elements could be made from conductive polymers, ceramic $BaTiO_3$, or any other PTC material having a resistivity greater than 0.1 ohm.cm at room temperature.

Figure 1:
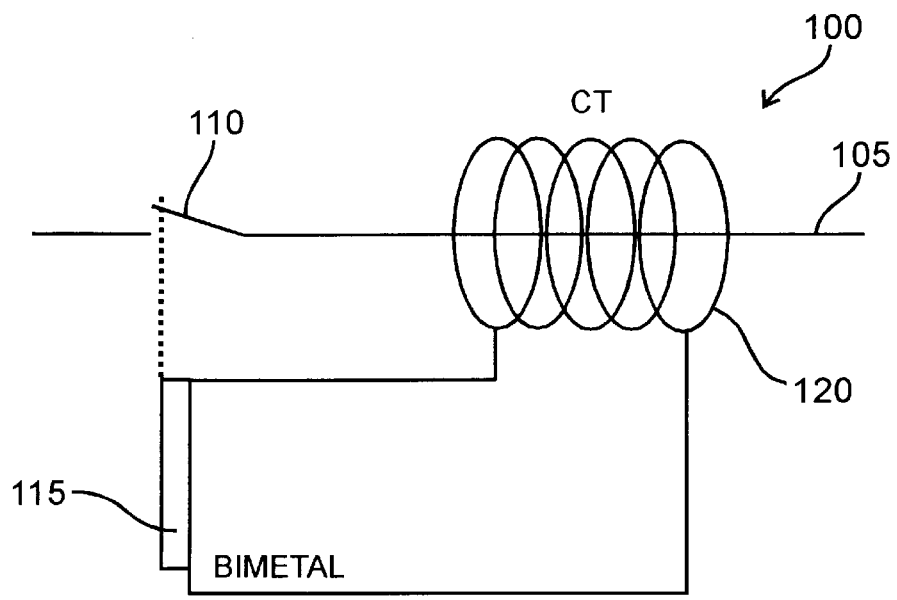
FIG. 1 (prior art) illustrates a high ampere rated circuit breaker having a bimetal element to protect the circuit breaker from overload.

FIG. 1 (labeled prior art) illustrates a high ampere rated circuit breaker 100 for interrupting the flow of electric current in a line 105 by activating a switch 110 connected to the line 105. The circuit breaker 100 includes a bimetal element 115 to protect the circuit breaker 100 from overload. The bimetal element 115 is connected to a voltage limiting device such as current transformer 120. The current transformer 120 senses the current in the line 105. The current in the current transformer 120 is linearly proportional to the main current in the line 105. If the main current reaches 135% of the ampere rating of the circuit breaker 100, the current transformer 120 transfer a current of 135% of the ampere rating of the bimetal 115. The extra current will cause the bimetal 115 to bend or deflect and open the switch 110.

Figure 2:
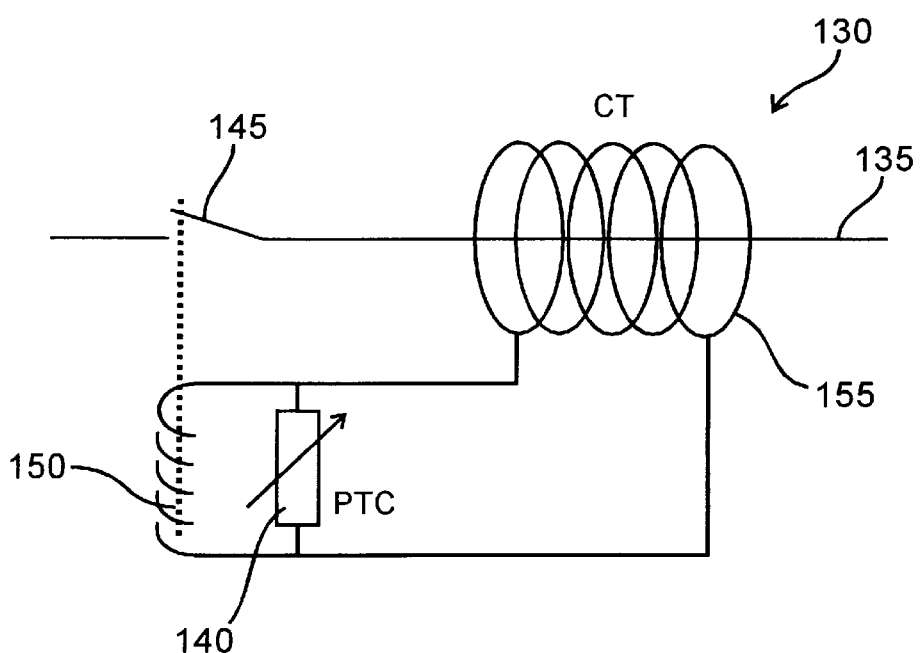
FIG. 2 illustrates a high ampere rated circuit breaker as in FIG. 1 wherein a PTC element having a reduced tolerance in accordance with the present invention is used to replace the bimetal element to protect the circuit breaker from overload.

FIG. 2 illustrates a high ampere rated circuit breaker 130 for interrupting the flow of electric current in a line 135 wherein a PTC element 140 having a reduced tolerance in accordance with the present invention is used to replace the bimetal element of FIG. 1 to protect the circuit breaker 130 from overload. A switch 145 is connected in series with the line 135, the switch 145 having an open and a closed position. An actuating device such as, a relay coil 150, is connected to the switch 145 to change the switch 145 from the closed position to the open position wherein the flow of electric current in the line 135 is interrupted. The relay coil 150 is actuated by an activating signal such as a predetermined current or voltage level.

The PTC element 140 is connected to the relay coil 150 for providing the activating signal to the relay coil 150. The PTC element 140 is tripped at least once reducing the tolerance range of the PTC element 140. A current transformer 155 is connected in parallel to the PTC element 140.

The tolerance of a typical current transformer used in a circuit breaker is about 2%, and can be lowered down to less than 1% using expensive materials and techniques. The combination of the PTC element 140 having a reduced tolerance range according to the present invention and the current transformer 155 is able to satisfy the circuit breaker design requirements. Under normal operations, most of the current generated by the current transformer 155 passes through the PTC element 140 because that the relay coil 150 has a higher resistance than the PTC element 140 at room temperature. When the current through the switch 145 increases to 135% of the ampere rating of the circuit breaker 130, the current through the PTC element 140 will also increase to 135% of the ampere rating of the PTC element 140. The extra current will increase the PTC element 140 temperature and cause the PTC element 140 to trip activating the relay coil 150. Most of current generated by the current transformer 155 will then pass through and energize the relay coil 150. The relay coil 150 unlatches the switch 145 tripping the circuit breaker 130.

Figure 3:
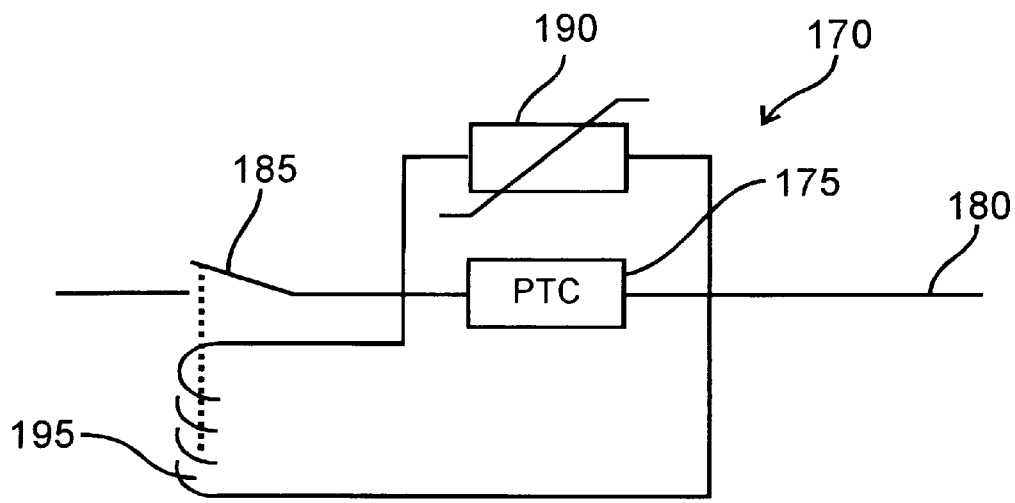
FIG. 3 illustrates a low ampere rated circuit breaker including a PTC element having a reduced tolerance in accordance with another embodiment of the present invention.

FIG. 3 illustrates a low ampere rated circuit breaker 170 including a PTC element 175 having a reduced tolerance range. The PTC element 175 is tripped at least once, reducing the tolerance of the PTC element 175 especially useful in low ampere rated circuit breakers. The circuit breaker 170 is connected to the line 180 and includes switch 185. In series with the switch 185 is the PTC element 175 shunted by one or more voltage limiting devices, such as a metal oxide varistor 190. The rated voltage of the varistor 190 is equal to or smaller than the rated voltage of the PTC element 175. The switch 185 is actuated to open by an actuating device, for example, a magnetic latching relay coil 195 connected in parallel with the PTC element 175. The PTC element 175 provides an actuating signal such as a predetermined current or voltage level for actuating the coil 195.

In another embodiment of the present invention, at least two PTC elements are combined and matched to provide an increased ampere rating of the PTC element and a decreased tolerance range. A low resistance PTC element is matched with a high resistance PTC element or a medium resistance PTC element is matched with a medium resistance PTC element. In a preferred embodiment, multiple PTC elements are tripped at least once and the resistance of the PTC elements are measured wherein at least two PTC elements are matched for use in a circuit breaker.

Figure 4:
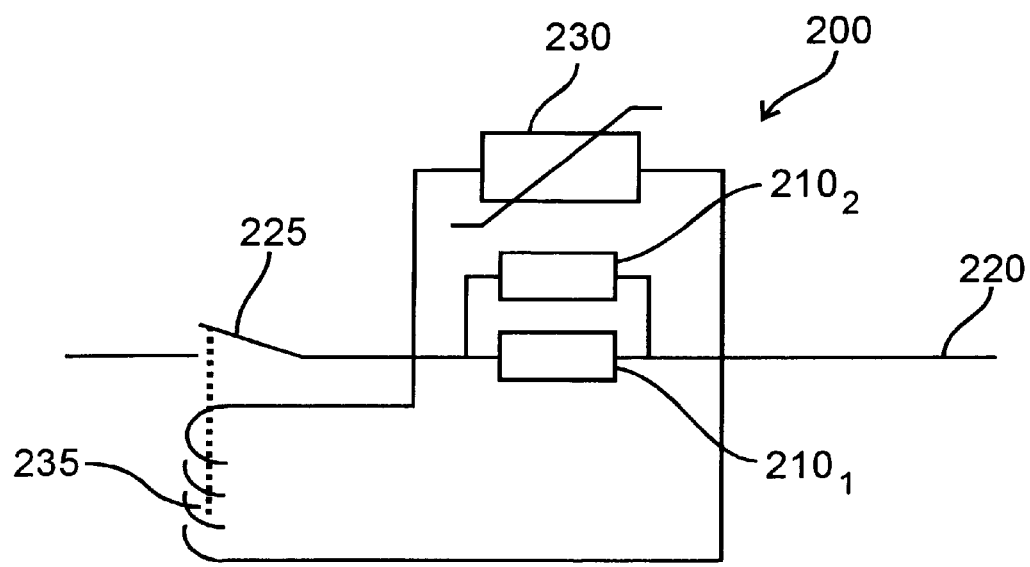
FIG. 4 illustrates the circuit breaker of FIG. 3 having a higher ampere rating and including at least two PTC elements having a combined reduced tolerance range in accordance with another embodiment of the present invention.

FIG. 4 illustrates the circuit breaker 200 having an increased ampere rating and including at least two PTC elements $210_1$ and $210_2$, respectively, connected in parallel and having a combined reduced tolerance range in accordance with the present invention. The PTC elements $210_1$ and $210_2$, respectively, are tripped at least once and the resistance of the PTC elements are measured. The at least two PTC elements $210_1$ and $210_2$ are matched, for example, a low resistance PTC element $210_1$ is matched with a high resistance PTC element $210_2$. The circuit breaker 200 is connected to the line 220 and includes switch 225. In series with the switch 225 are the at least two PTC elements $210_1$ and $210_2$, respectively, shunted by one or more voltage limiting devices, such as a metal oxide varistor (MOV element) 230. The rated voltage of the MOV element 230 is equal to or smaller than the rated voltage of the connected at least two PTC elements $210_1$ and $210_2$. The switch 225 is actuated to open by an actuating device 235, for example, a magnetic latching relay coil connected in parallel with the at least two PTC elements $210_1$ and $210_2$.

Figure 5:
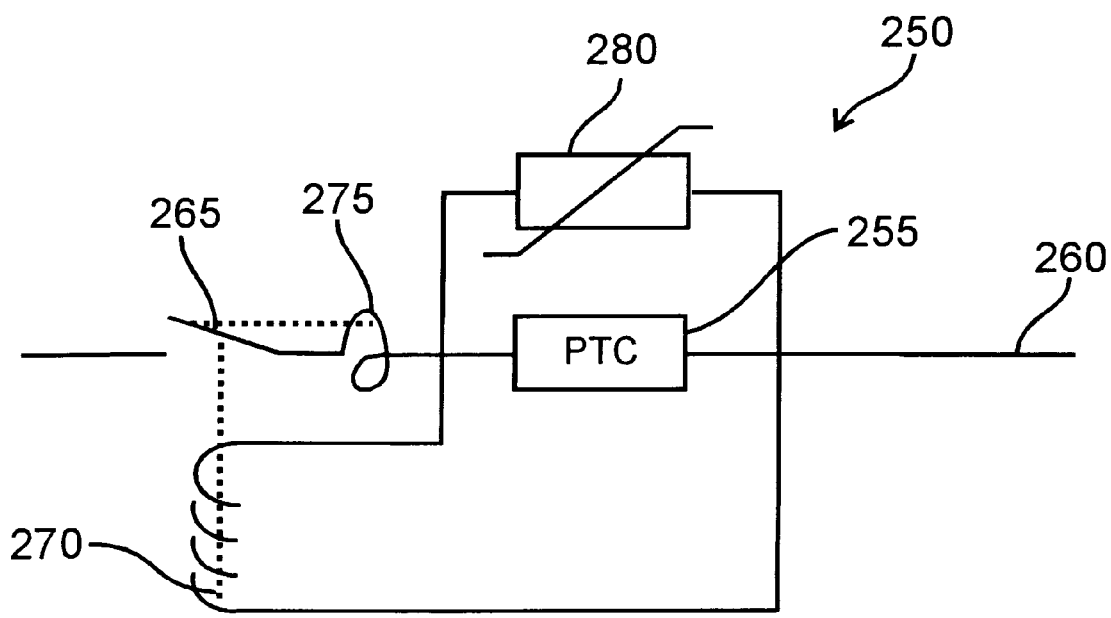
FIG. 5 illustrates a second low ampere rated circuit breaker including a PTC element having a reduced tolerance in accordance with still another embodiment of the present invention.

FIG. 5 illustrates a second low ampere rated circuit breaker 250 including a PTC element 255 having a reduced tolerance in accordance with the present invention. The PTC element 255 is connected in series with the main circuit line 260. The PTC element 255 is a conductive polymer, such as manufactured by Raychem or Bourns. The switch 265 is connected in series with the PTC element 255. The PTC element 255 provides a first activating signal, such as a current or voltage level, to a first actuating device, such as magnetic relay coil 270. The circuit breaker 250 is unlatched to open the switch 265 by coil 270 connected in parallel with the PTC element 270, for example, during a small overload such as 135% and 200% of the ampere rating. The resistance of the coil 270 is larger than that of the PTC element 255 at room temperature. Under normal operations, most of the current in the circuit breaker 250 passes through the PTC element 255 instead of the coil 270. The coil 270 is energized to unlatch the circuit breaker 250 and trip the switch 265 whenever the voltage across the PTC element 255 and the current through the PTC element 255 reaches a certain value. During an overload, high current flowing through the PTC element 255 heats the PTC element 255 and the resistance of the PTC element 255 increases sharply as the temperature increases over a threshold value. The voltage across the PTC element 255 will reach the predetermined value, and thus energize the coil 270.

A second actuating device, for example, a magnetic coil 275, is connected in series to the switch 265 and the PTC element 255. If the current through the circuit breaker 250 reaches a value higher than about 500% of the ampere rating, the coil 275 produces a magnetic force strong enough to unlatch the circuit breaker 250 instantaneously. Preferably, a magnetic trip mechanism is used in accordance with U.S. Pat. application, Ser. No. 09/054,282, filed Apr. 2, 1998, entitled "Circuit Breaker Including Two Magnetic Coils Ad A Positive Temperature Coefficient Resistivity Element", filed concurrently herewith. The PTC element 255 is shunted by one or more voltage limiting devices, such as a metal oxide varistor 280 and provides a shunt path for the extra current during a high current interruption, wherein the PTC element 255 is protected from breaking down. Two or more PTC elements (not shown) may also be connected to the line according to the present invention as illustrated in FIG. 4 wherein the ampere rating of the circuit breaker is increased.

The PTC elements are screened, for example, by using only the resistance of the PTC element after tripping at least once or the combination of the resistance after tripping and the mass of each individual PTC element. The thermal properties of a PTC element largely depends on the resistance and mass of the PTC element. Therefore, the resistance and mass of the PTC element is used to screen the PTC element for a particular circuit breaker.

The following results illustrate that the tolerance of a PTC element is decreased, and circuit breakers having a PTC element instead of bimetal can be practically designed. The tested circuit breakers are SQUARE D TOK™ circuit breakers. Half of the circuit breakers tested were assembled with two RUE900™ PTC elements in each circuit breaker, and another half were assembled with two RUE700™ PTC elements in each circuit breaker. The ampere rating of the circuit breakers including the RUE900™ is 18 A, and that of the circuit breakers including the RUE700™ is 14 A. Trip times at 135% and 200% ampere rating have been measured at room temperature, and the statistical results are shown below in the table.

invention also provides for low cost miniature circuit breakers. When the PTC element having a reduced tolerance according to the present invention is connected in series in the main circuit for a low ampere circuit breaker, the PTC element provides much better current limiting than existing circuit breakers using a bimetal during a short circuit interruption. In addition, up to 100% interruption energy is converted into the heat of PTC/MOV rather than in generating arc and pressure as in existing circuit breakers. Almost 100% interruption energy goes into arcing in existing circuit breakers. In the present invention, up to 100% interruption energy is transferred into PTC and MOV elements, so that the arcing energy is effectively reduced in the low ampere circuit breakers.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A method for interrupting the flow of electric current in a line comprising:

connecting a switch to the line, the switch having an open and a closed position;

connecting an actuating device, actuated by an activating signal, to the switch to move the switch from the closed position to the open position wherein the flow of electric current in the line is interrupted;

tripping a positive temperature coefficient resistivity element (PTC element) at least once wherein tolerance of the PTC element is reduced to obtain a required tolerance;

screening the PTC element wherein, after tripping the PTC element at least once, the mass and resistance of the PTC element are measured to determine the tolerance of the PTC element; and connecting the PTC element to the actuating device for providing the activating signal to the actuating device.

2. A method for interrupting the flow of electric current in a line comprising:

connecting a switch with the line, the switch having an open and a closed position;

connecting an actuating device, actuated by an activating signal, to the switch to move the switch from the closed position to the open position wherein the flow of electric current in the line is interrupted;

tripping a plurality of positive temperature coefficient resistivity elements (PTC elements) at least once

TRIP TIME RESULTS OF TESTED CIRCUIT BREAKERS.

| % I | Device Name | Quantity | Average Trip Time (m:s) | Max. Trip Time (m:s) | Min. Trip Time (m:s) | Standard Deviation (m:s) |
| --- | --- | --- | --- | --- | --- | --- |
| 135% | TOK 14A | 100 | 03:25.9 | 04:46.9 | 02:48.0 | 00:18.6 |
|  | TOK 18A | 100 | 03:43.6 | 04:50.0 | 3:03.8 | 00:19.1 |
| 200% | TOK 14A | 100 | 00:42.9 | 00:52.5 | 00:36.5 | 00:02.8 |
|  | TOK 18A | 100 | 00:49.3 | 00:61.1 | 00:44.6 | 00:02.7 |

The method and apparatus of the present invention eliminates the use of bimetal and the need for calibration of circuit breakers, so that the problems and costs related to calibration of circuit breakers is eliminated. The present wherein the tolerance of each of the plurality of PTC elements is reduced;

testing each of the PTC elements after tripping to determine a tolerance value for each of the PTC elements;

matching at least two of the PTC elements after tripping wherein, when the at least two PTC elements are connected in parallel, the combined tolerance is reduced; and connecting the at least two PTC elements to the actuating device for providing the activating signal to the actuating device wherein ampere rating for the line is increased.

3. A method, as recited in claim 2, wherein a high resistance PTC element is matched with a low resistance PTC element.

4. A method, as recited in claim 2, wherein a medium resistance PTC element is matched with a medium resistance PTC element.

5. A circuit breaker for interrupting the flow of electric current in a line comprising:

a switch connected in series with the line, the switch having an open and a closed position;

a first actuating device, actuated by a first activating signal, connected to the switch to move the switch from the closed position to the open position wherein the flow of electric current in the line is interrupted;

a first positive temperature coefficient resistivity element (PTC element) connected to the first actuating device for providing the first activating signal to the first actuating device wherein the PTC element is tripped at least once wherein tolerance of the PTC element is reduced to obtain a required tolerance of the PTC element;

a voltage limiting device connected in parallel to the PTC element; and a second actuating device, actuated by a second activating signal, connected to the switch to move the switch from the closed position to the open position wherein the flow of electric current in the line is interrupted.

6. A circuit breaker, as recited in claim 5, wherein the first actuating device is a magnetic relay coil connected in parallel to the first PTC element.

7. A circuit breaker, as recited in claim 5, wherein the voltage limiting device is a current transformer.

8. A circuit breaker, as recited in claim 5, wherein the voltage limiting device is a metal oxide varistor.

9. A circuit breaker, as recited in claim 5, wherein the second actuating device is a magnetic coil connected in series with the first PTC element.

10. A circuit breaker, as recited in claim 5, further comprising:

at least one additional PTC element connected in parallel to the first PTC element to provide an increased ampere rating for the circuit breaker and wherein the at least one additional PTC element is tripped at least once and is matched to the first PTC element for a reduced tolerance.

11. A circuit breaker for interrupting the flow of electric current in a line comprising:

a switch connected in series with the line, the switch having an open and a closed position;

a first magnetic coil, actuated by a first activating signal, connected to the switch to move the switch from the closed position to the open position wherein the flow of electric current in the line is interrupted;

a first positive temperature coefficient resistivity element (PTC element) connected in parallel to the first magnetic coil for providing the first activating signal and wherein the PTC element is tripped at least once for providing a reduced tolerance in the PTC element to obtain a required tolerance of the PTC element;

a metal oxide varistor connected in parallel to the PTC element; and a second magnetic coil, actuated by a second activating signal, connected in series with the switch to move the switch from the closed position to the open position wherein the flow of electric current in the line is interrupted, wherein the second activating signal is provided by a predetermined current level of the circuit breaker.

12. A circuit breaker, as recited in claim 11, further comprising:

at least one additional PTC element connected in parallel to the first PTC element to provide an increased ampere rating for the circuit breaker and wherein the at least one additional PTC element is matched to the first PTC element for a reduced tolerance.

* * * * *